US012624667B2

(12) United States Patent
Hamaguchi

(10) Patent No.: US 12,624,667 B2
(45) Date of Patent: May 12, 2026

(54) CONTROL DEVICE FOR HYDROGEN ENGINE

(71) Applicant: TOYOTA JIDOSHA KABUSHIKI KAISHA, Toyota (JP)

(72) Inventor: Ryu Hamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 19/001,449

(22) Filed: Dec. 25, 2024

(65) Prior Publication Data

US 2025/0327428 A1 Oct. 23, 2025

(30) Foreign Application Priority Data

Apr. 18, 2024 (JP) ................................. 2024-067665

(51) Int. Cl.
*F02D 19/02* (2006.01)
*F02B 43/10* (2006.01)

(52) U.S. Cl.
CPC ............ *F02D 19/024* (2013.01); *F02B 43/10* (2013.01)

(58) Field of Classification Search
CPC .... F02D 19/024; F02D 41/064; F02D 41/003; F02D 41/0027; F02D 45/00; F02D 2200/023; F02D 2250/08; F02D 2250/26; F02B 43/10; F02B 43/12; F02M 21/0206; F02M 35/10222; F01M 13/00
See application file for complete search history.

(56) References Cited

U.S. PATENT DOCUMENTS 6,606,982 B1 * 8/2003 Stockhausen ...... F01M 13/0011 123/572
7,747,366 B2 * 6/2010 Karlsson ............. G01M 13/021 477/76
8,602,001 B2 * 12/2013 Kaiser ................. F02D 41/1497 123/686
2016/0102623 A1 * 4/2016 Hakeem .................. F01M 5/04 701/113
2023/0313750 A1 * 10/2023 Li ...................... F01M 13/0011 123/41.86

FOREIGN PATENT DOCUMENTS

JP H02-298632 A 12/1990
JP 2013-100730 A 5/2013

* cited by examiner

*Primary Examiner* — Grant Moubry
(74) *Attorney, Agent, or Firm* — SoraIP, Inc.

(57) ABSTRACT

The hydrogen engine includes a blow-by gas passage that recirculates the blow-by gas leaked from the combustion chamber to the crankcase from the crankcase to the intake passage. The threshold temperature is set in advance based on the temperature at which the water contained in the oil stored in the crankcase starts evaporation in the crankcase. The control device limits the output of the hydrogen engine from when the oil temperature, which is the temperature of the oil, exceeds the threshold temperature for a predetermined period of time.

5 Claims, 5 Drawing Sheets

CONTROL DEVICE FOR HYDROGEN ENGINE

CROSS-REFERENCE TO RELATED APPLICATION

This application claims priority to Japanese Patent Application No. 2024-067665 filed on Apr. 18, 2024, incorporated herein by reference in its entirety.

BACKGROUND

1. Technical Field

The present disclosure relates to a control device for a hydrogen engine.

2. Description of Related Art

Japanese Unexamined Patent Application Publication No. 2013-100730 (JP 2013-100730 A) discloses a control device for an internal combustion engine. The internal combustion engine includes a pressure sensor that detects a pressure inside a crankcase. When the pressure detected by the pressure sensor is equal to or higher than a predetermined pressure, the control device performs a limiting process for limiting the power of the internal combustion engine. When the pressure detected by the pressure sensor is equal to or higher than the predetermined pressure, there is a high possibility that abnormal combustion such as pre-ignition has occurred. As the power of the internal combustion engine is smaller, the abnormal combustion is less likely to occur. Therefore, the control device can suppress the occurrence of the abnormal combustion through the limiting process.

SUMMARY

During operation of a hydrogen engine, blow-by gas may leak from a combustion chamber into a crankcase. Compared to a gasoline engine, the blow-by gas in the hydrogen engine contains more moisture. Due to a long cold operation time after the startup of the hydrogen engine, the moisture from the blow-by gas may accumulate in oil in the crankcase. When the oil temperature rises along with continuation of the engine operation from this state, the moisture accumulated in the oil due to the blow-by gas starts to evaporate. Therefore, the pressure inside the crankcase rises abruptly. In such a case, there is a possibility that the oil is jetted together with the blow-by gas toward an intake passage through a blow-by gas passage that recirculates the blow-by gas to the intake passage.

Hereinafter, means for solving the above problem and its operations and effects will be described.

An aspect of the present disclosure provides a control device for a hydrogen engine including a blow-by gas passage through which blow-by gas leaked from a combustion chamber into a crankcase is recirculated from the crankcase to an intake passage.

A threshold temperature is preset based on a temperature at which moisture contained in oil stored in the crankcase starts to evaporate in the crankcase.

The control device is configured to limit power of the hydrogen engine for a predetermined period from a time when an oil temperature of the oil exceeds the threshold temperature.

With the above configuration, it is possible to suppress the jet of the oil toward the intake passage through the blow-by gas passage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a hydrogen engine control device according to a first embodiment will be described with reference to the drawings.

Configuration of the Hydrogen Engine 100

Figure 1:
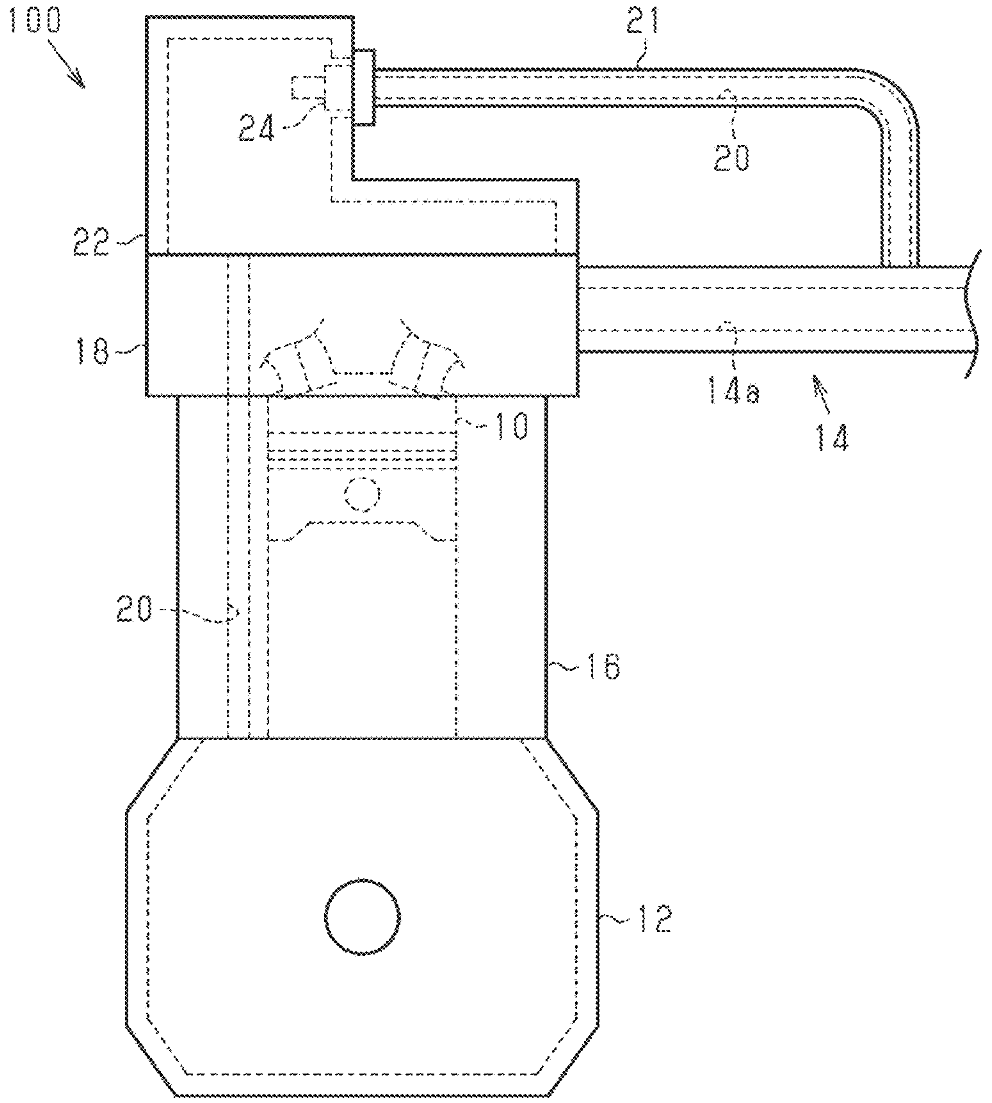
FIG. 1 is a schematic diagram illustrating a configuration of a hydrogen engine according to an embodiment.

As shown in FIG. 1, the hydrogen engine 100 includes a cylinder block 16. The hydrogen engine 100 has a cylinder head 18 attached to the upper end of the cylinder block 16. The hydrogen engine 100 has a crankcase 12 attached to the lower end of the cylinder block 16. An upper portion of the cylinder head 18 is covered with a ventilation case 22.

When fuel is burned in the combustion chamber 10 of the hydrogen engine 100, blow-by gas leaks from the combustion chamber 10 of the hydrogen engine 100 to the crankcase 12. The hydrogen engine 100 includes a blow-by gas reduction device for flowing blow-by gas leaked to the crankcase 12 to the intake system 14 of the hydrogen engine 100. FIG. 1 shows an intake passage **14*a* which is part of the intake system 14**.

The blow-by gas reduction device has a blow-by gas passage 20 for flowing the blow-by gas to the intake system 14 of the hydrogen engine 100. That is, the hydrogen-engine 100 includes the blow-by gas passage 20 that recirculates the blow-by gas leaked from the combustion chamber 10 to the crankcase 12 from the crankcase 12 to the intake passage **14*a*. The blow-by gas reduction device includes a PCV (Positive Crankcase Ventilation) bulb 24 for regulating the quantity of blow-by gas flowing through the blow-by gas passage 20. PCV bulb 24 is provided in the blow-by gas passage 20 and is attached to the ventilation case 22**.

The blow-by gas passage 20 communicates with the crankcase 12. The blow-by gas passage 20 extends in the cylinder block 16 and in the cylinder head 18. The inside of the ventilation case 22 is a part of the blow-by gas passage 20. As described above, PCV bulb 24 is attached to the ventilation case 22. A hose 21 connects PCV valve 24 and the intake passage **14*a*. The inside of the hose 21 is a part of the blow-by gas passage 20. In this way, the blow-by gas passage 20 communicates with the intake passage 14*a***.

As described above, the ventilation case 22 is provided in the middle of the blow-by gas passage 20. PCV valve 24 is provided in the middle of the blow-by gas passage 20. As described above, PCV bulb 24 adjusts the quantity of blow-by gas flowing through the blow-by gas passage 20. Accordingly, the flow rate of the blow-by gas flowing from the crankcase 12 to the intake passage 14*a* changes. PCV valve 24 is a one-way valve that allows the flow of gas from the crankcase 12 side to the intake passage 14*a* side and blocks the flow of gas from the intake passage 14*a* side to the crankcase 12 side. PCV valve 24 is opened when the difference between the pressure in the crankcase 12 upstream of PCV valve 24 and the pressure in the intake passage 14*a* downstream of PCV valve 24 becomes equal to or larger than a predetermined value.

Control Device 50

Figure 2:
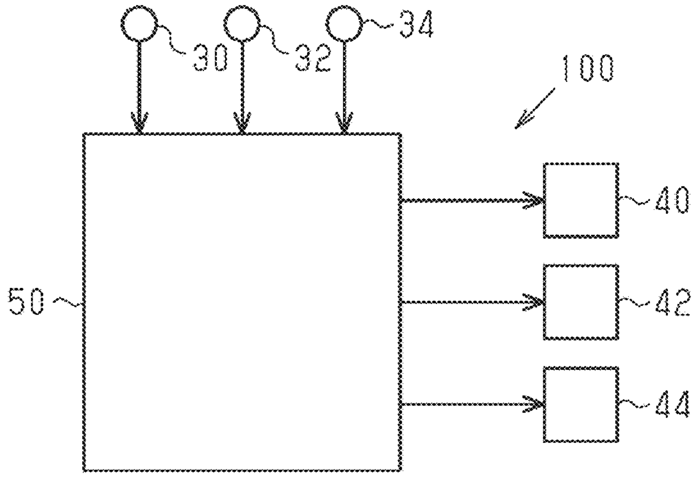
FIG. 2 shows a control device for controlling the hydrogen engine shown in FIG. 1.

As illustrated in FIG. 2, the control device 50 of the hydrogen engine 100 acquires various signals from the hydrogen engine 100. For example, the control device 50 acquires a signal from the oil temperature sensor 30 that detects the oil temperature, which is the temperature of the oil stored in the crankcase 12. The control device 50 acquires a signal from the pressure sensor 32 that detects the crankcase pressure, which is the pressure in the crankcase 12. The control device 50 acquires a signal from the water temperature sensor 34 that detects the temperature of the coolant for cooling the hydrogen engine 100.

The control device 50 controls the fuel injection valve 40, the ignition device 42, the throttle valve 44, and the like included in the hydrogen engine 100 based on various signals acquired from the hydrogen engine 100. Thus, the control device 50 controls the output of the hydrogen engine 100.

Processing Executed by the Control Device 50

Figure 3:
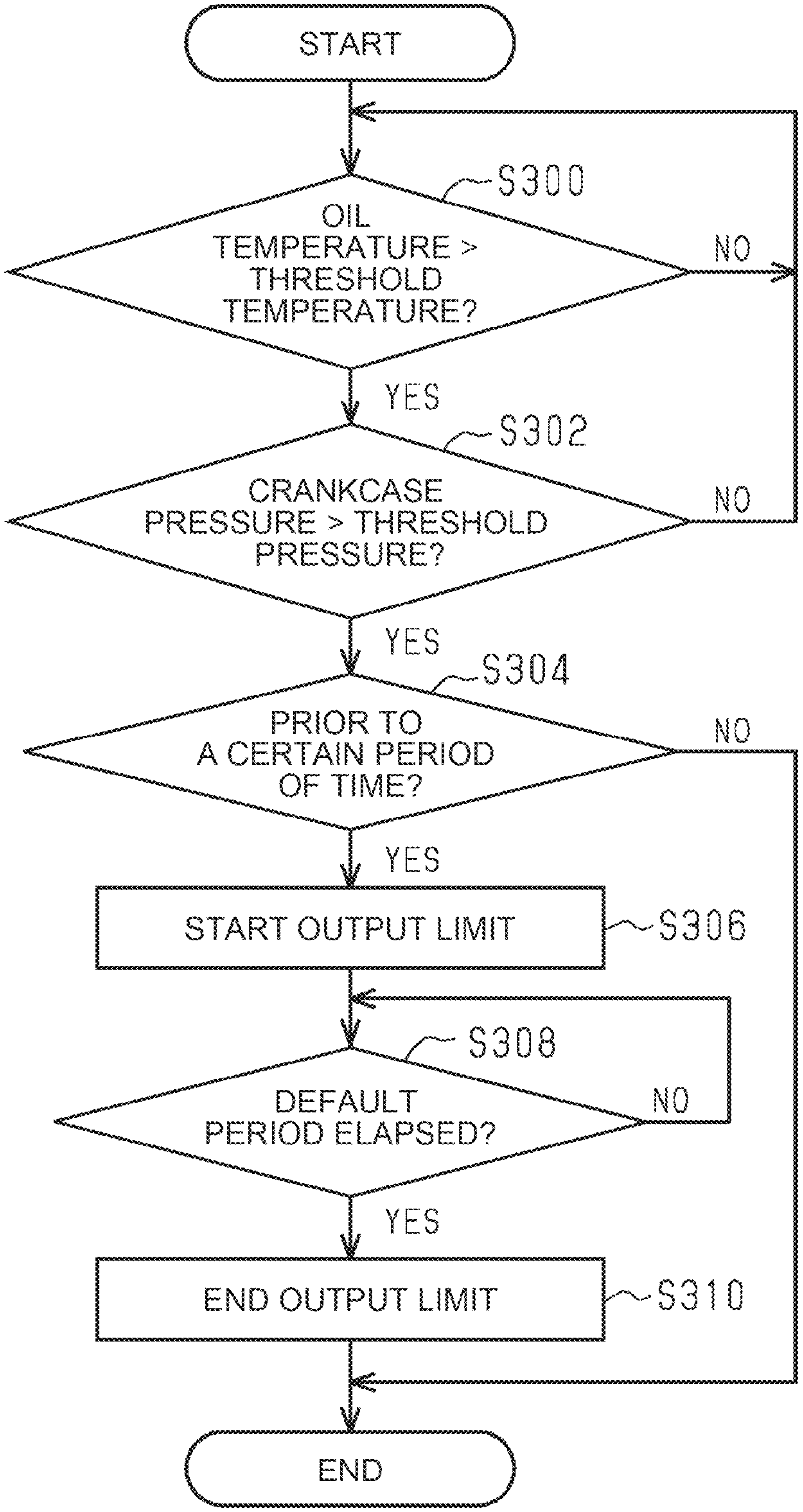
FIG. 3 is a flowchart illustrating a process according to the first embodiment.

Processing executed by the control device 50 will be described with reference to FIG. 3. The control device 50 starts the flow of FIG. 3 when the hydrogen engine 100 is started. After the processing shown in FIG. 3 is completed, the control device 50 does not execute the flow shown in FIG. 3 until the hydrogen engine 100 is started again. For this reason, the control device 50 limits the power of the hydrogen-engine 100 for a predetermined period of time (from S306 to S310) on the condition that a logical AND condition to be described later is satisfied for the first time between one trip. Here, the logical AND condition includes a condition that the oil temperature exceeds the threshold temperature, and a condition that the crankcase pressure detected by the pressure sensor 32 exceeds the threshold pressure. One trip is a period from the start of the hydrogen engine 100 to the stop.

In S300, the control device 50 determines whether or not the oil temperature acquired from the oil temperature sensor 30 exceeds the threshold temperature. Here, the threshold temperature is set in advance based on the temperature at which the water contained in the oil stored in the crankcase 12 starts evaporation in the crankcase 12. The threshold temperature may be a temperature at which moisture contained in the oil starts to evaporate, a temperature slightly higher than the temperature at which evaporation is started, or a temperature slightly lower than the temperature at which evaporation is started. When a negative determination is made in S300 (S300: NO), the control device 50 repeats S300. When an affirmative determination is made in S300 (S300: YES), the control device 50 proceeds to S302.

In S302, the control device 50 determines whether the crankcase pressure detected by the pressure sensor 32 exceeds the threshold pressure. The threshold pressure is set to be lower than the pressure at which oil is ejected from the blow-by gas passage 20 toward the intake passage 14*a*. When a negative determination is made in S302 (S302: NO), the control device 50 returns to S300. When an affirmative determination is made in S302 (S302: YES), the control device 50 proceeds to S304.

In S304, the control device 50 determines whether or not the crankcase pressure exceeds the threshold pressure during a certain period of time after the oil temperature exceeds the threshold temperature. The predetermined period is set in advance as appropriate, for example, several tens of seconds. When a negative determination is made in S304 (S304: NO), the control device 50 ends the process of FIG. 3. If an affirmative determination is made in S304 (S304: YES), the control device 50 proceeds to S306.

The control device 50 begins to limit the power of the hydrogen-engine 100 at S306. In the first embodiment, the control device 50 lowers the output of the hydrogen engine 100 by a predetermined amount. The control device 50 does not increase the output of the hydrogen engine 100 after reducing the output of the hydrogen engine 100 by a predetermined amount. The control device 50 then proceeds to S308.

In S308, the control device 50 determines whether or not a predetermined period has elapsed since the oil temperature exceeded the threshold temperature. When a negative determination is made in S308 (S308: NO), the control device 50 repeats S308. When an affirmative determination is made in S308 (S308: YES), the control device 50 proceeds to S310.

In S310, the control device 50 terminates the power limit of the hydrogen-engine 100. After completing S310, the control device 50 terminates the process of FIG. 3.

Operation of the First Embodiment

Figure 4:
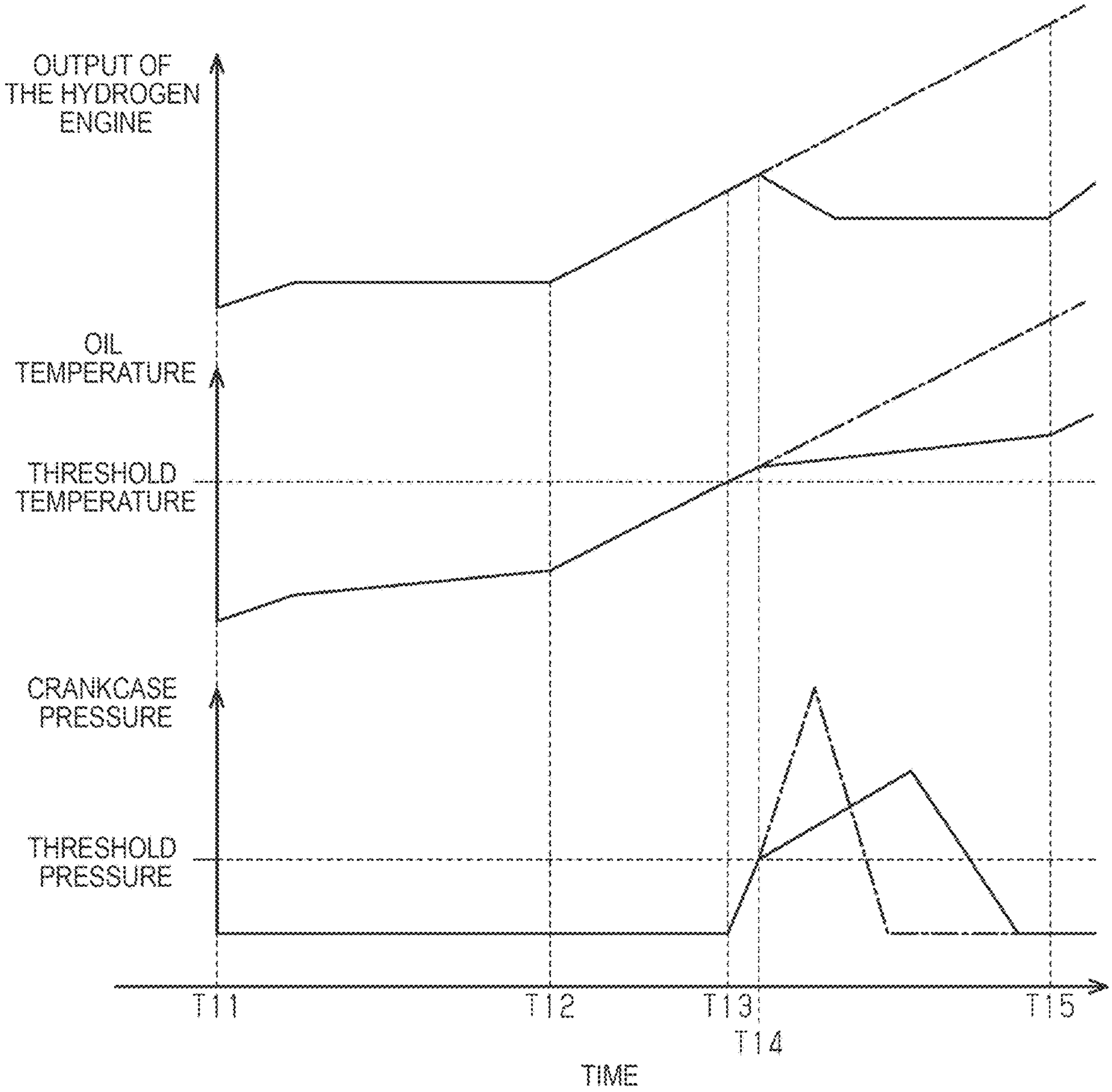
FIG. 4 is a time chart for explaining the operation according to the first embodiment.

The operation of the first embodiment will be described with reference to FIG. 4. In FIG. 4, a solid line represents an example in which the output of the hydrogen engine 100 according to the first embodiment is limited. In FIG. 4, the dashed-dotted line represents a comparative example in which the output of the hydrogen engine 100 is not limited.

At time T11, the hydrogen-engine 100 is activated. The control device 50 starts the flow of FIG. 3 as the hydrogen engine 100 is started. The hydrogen-engine 100 performs cold operation from the time T11 to the time T12. With cold operation, water from the blow-by gas accumulates in the oil.

In the embodiment illustrated in FIG. 4, the power of the hydrogen-engine 100 increases after the time T12. As the output of the hydrogen engine 100 increases, the crankcase pressure and the oil temperature increase. At time T13, the oil temperature exceeds the threshold temperature (S300: YES). In the embodiment illustrated in FIG. 4, the oil temperature exceeds the threshold temperature after the time T13. Then, at time T14, the crankcase pressure exceeds the threshold pressure (S302: YES).

In the first embodiment, the power of the hydrogen-engine 100 is limited from the time T14 to the time T15 (S306, S308: NO). On the other hand, in the comparative example, the output of the hydrogen engine 100 is not limited. In particular, in the comparative example, the power of the hydrogen-engine 100 is increased after the time T14 as indicated by the dashed-dotted line.

In the first embodiment, since the power of the hydrogen-engine 100 is limited from the time T14 to the time T15, an increase in the oil temperature is suppressed as compared with the comparative example. The peak value of the crankcase pressure decreases due to the suppression of the increase in the oil temperature.

In the time T15, a predetermined time period elapses. For this reason, the control device 50 terminates the limit of the power of the hydrogen-engine 100 at the time T15 (S308: YES, S310).

Effect of the First Embodiment (1-1) The hydrogen engine 100 includes a blow-by gas passage 20 that recirculates the blow-by gas leaked from the combustion chamber 10 to the crankcase 12 from the crankcase 12 to the intake passage 14*a*. The threshold temperature is set in advance based on the temperature at which the water contained in the oil stored in the crankcase 12 starts evaporation in the crankcase 12. The control device 50 limits the power of the hydrogen-engine 100 (from S300, S306 to S310) from when the oil temperature, which is the temperature of the oil, exceeds the threshold temperature for a predetermined time.

When the oil temperature exceeds a certain level, the water accumulated in the oil starts to evaporate at the same time. The greater the output of the hydrogen engine 100, the greater the amount of blow-by gas leaking into the crankcase 12. Therefore, if a high output is generated when the moisture in the oil starts to evaporate, the pressure increase due to the evaporation of the moisture and the inflow of a large amount of blow-by gas may overlap each other, and the pressure inside the crankcase 12 may suddenly increase. When the pressure in the crankcase 12 suddenly rises, there is a possibility that oil is jetted along with the blow-by gas toward the intake passage 14*a* through the blow-by gas passage 20. According to the above configuration, the control device 50 limits the output of the hydrogen engine 100 for a predetermined period of time when the oil temperature exceeds the threshold temperature. Therefore, after the oil temperature exceeds the threshold temperature, an increase in the pressure in the crankcase 12 can be suppressed. That is, the peak value of the pressure in the crankcase 12 can be reduced. Therefore, it is possible to prevent the oil from being ejected toward the intake passage 14*a* through the blow-by gas passage 20.

(1-2) The hydrogen engine 100 includes a pressure sensor 32 that detects a crankcase pressure that is a pressure in the crankcase 12. When the logical AND condition is satisfied, the control device 50 limits the output of the hydrogen engine 100 for a predetermined period of time. Here, the logical AND condition includes a condition that the oil temperature exceeds the threshold temperature, and a condition that the crankcase pressure detected by the pressure sensor 32 exceeds the threshold pressure. The threshold pressure is set to be lower than the pressure at which oil is ejected from the blow-by gas passage 20 toward the intake passage 14*a*.

When the crankcase pressure is sufficiently low, there is a low possibility that the oil is jetted toward the intake passage 14*a* through the blow-by gas passage 20. The control device 50 limits the output of the hydrogen engine 100 for a predetermined period of time if the oil temperature is above the threshold temperature and the crankcase pressure is above the threshold pressure. Therefore, it is possible to avoid limiting the output of the hydrogen engine 100 even though the crankcase pressure is sufficiently low.

(1-3) The hydrogen engine 100 includes a pressure sensor 32 that detects a crankcase pressure that is a pressure in the crankcase 12. The control device 50 limits the power of the hydrogen-engine 100 for a predetermined period of time (from S304: YES, S306 to S310) if the crankcase pressure exceeds the threshold pressure for a period of time after the oil temperature exceeds the threshold temperature. The threshold pressure is set to be lower than the pressure at which oil is ejected from the blow-by gas passage 20 toward the intake passage 14*a*.

If the crankcase pressure exceeds the threshold pressure after a certain period of time has elapsed since the oil temperature exceeds the threshold temperature, the output of the hydrogen engine 100 is not limited. Therefore, the output of the hydrogen engine 100 is not limited after sufficient water has been discharged from the oil after a sufficient time has elapsed since the oil temperature becomes equal to or higher than the threshold value. Therefore, it is easy to avoid restricting the power of the hydrogen-engine 100 even though there is a lower possibility that the oil is jetted toward the intake passage 14*a*.

(1-4) The hydrogen engine 100 includes a pressure sensor 32 that detects a crankcase pressure that is a pressure in the crankcase 12. The control device 50 limits the output of the hydrogen engine 100 for a predetermined period of time, provided that the AND condition is established for the first time between one trip. Here, the logical AND condition includes a condition that the oil temperature exceeds the threshold temperature, and a condition that the crankcase pressure detected by the pressure sensor 32 exceeds the threshold pressure. One trip is a period from the start of the hydrogen engine 100 to the stop. The threshold pressure is set to be lower than the pressure at which oil is ejected from the blow-by gas passage 20 toward the intake passage 14*a*.

According to the above configuration, the control device 50 limits the output of the hydrogen engine 100 for a predetermined period of time on condition that the logical AND condition is satisfied for the first time between one trip. Therefore, even if the crankcase pressure exceeds the threshold pressure after the oil temperature becomes equal to or higher than the threshold value and sufficient moisture is removed from the oil, the output of the hydrogen engine 100 is not limited. Therefore, it is easy to avoid restricting the power of the hydrogen-engine 100 even though there is a lower possibility that the oil is jetted toward the intake passage 14*a*.

Second Embodiment

Hereinafter, a hydrogen engine control device according to a second embodiment will be described with reference to the drawings. Descriptions of configurations common to the first embodiment and the second embodiment will be omitted. In the second embodiment, the hydrogen engine 100 executes the flow illustrated in FIG. 5 instead of the flow illustrated in FIG. 3.

Figure 5:
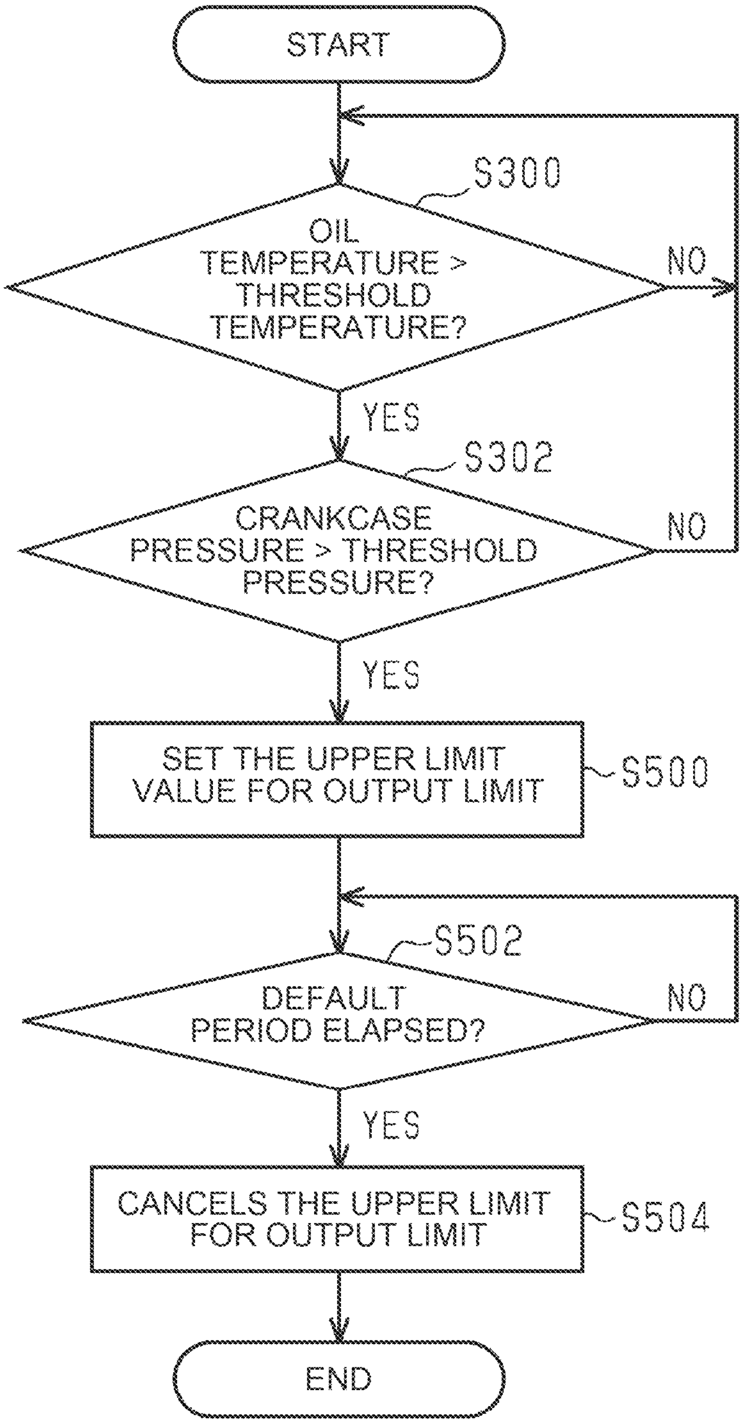
FIG. 5 is a flow chart showing a process according to the second embodiment.

Processing executed by the control device 50 will be described with reference to FIG. 5. The control device 50 starts the flow of FIG. 5 when the hydrogen engine 100 is started. After the processing shown in FIG. 5 is completed, the control device 50 does not execute the flow shown in FIG. 5 until the hydrogen engine 100 is started again.

In S300, the control device 50 determines whether or not the oil temperature exceeds the threshold temperature. When a negative determination is made in S300 (S300: NO), the control device 50 repeats S300. When an affirmative determination is made in S300 (S300: YES), the control device 50 proceeds to S302. S300 and S302 in the flow of FIG. 5 are the same processes as S300 and S302 in the flow of FIG. 3.

The control device 50 determines whether the crankcase pressure is above the threshold pressure in S302. When a negative determination is made in S302 (S302: NO), the control device 50 returns to S300. When an affirmative determination is made in S302 (S302: YES), the control device 50 proceeds to S500.

In S500, the control device 50 sets an upper limit to be used to limit the power of the hydrogen-engine 100. Accordingly, the control device 50 sets an upper limit value to the output of the hydrogen engine 100 and limits the output of the hydrogen engine 100 to be equal to or lower than the upper limit value. The control device 50 then proceeds to S502. In S502, the control device 50 determines whether or not a predetermined period has elapsed since the oil temperature exceeded the threshold temperature. When a negative determination is made in S502 (S502: NO), the control device 50 repeats S502. When an affirmative determination is made in S502 (S502: YES), the control device 50 proceeds to S504.

In S504, the control device 50 releases the upper limit used to limit the power of the hydrogen-engine 100. After completing S504, the control device 50 terminates the process of FIG. 5.

Operation of the Second Embodiment

Figure 6:
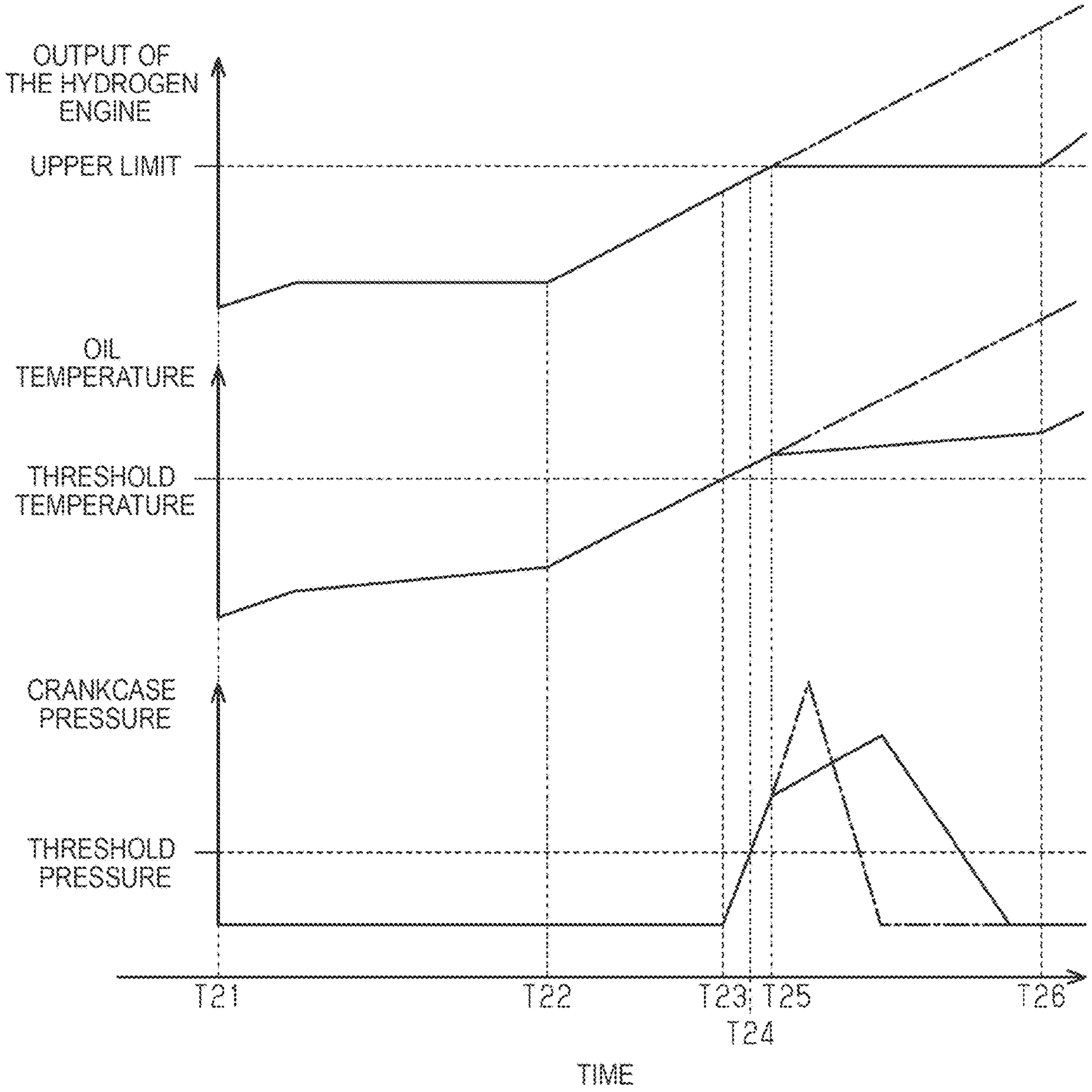
FIG. 6 is a time chart for explaining the operation according to the second embodiment.

The operation of the second embodiment will be described with reference to FIG. 6. In FIG. 6, a solid line represents an example in which the output of the hydrogen engine 100 according to the second embodiment is limited. In FIG. 6, the dashed-dotted line represents a comparative example in which the output of the hydrogen engine 100 is not limited.

At time T21, the hydrogen-engine 100 is activated. The control device 50 starts the flow of FIG. 5 as the hydrogen engine 100 is started. The hydrogen-engine 100 performs cold operation from the time T21 to the time T22. With cold operation, water from the blow-by gas accumulates in the oil.

In the embodiment illustrated in FIG. 6, the power of the hydrogen-engine 100 increases after the time T22. As the output of the hydrogen engine 100 increases, the crankcase pressure and the oil temperature increase. At time T23, the oil temperature exceeds the threshold temperature (S300: YES). In the embodiment illustrated in FIG. 6, the oil temperature exceeds the threshold temperature after the time T23. Then, at time T24, the crankcase pressure exceeds the threshold pressure (S302: YES). Therefore, in the second embodiment, in the time T24, the control device 50 sets an upper limit value for limiting the power of the hydrogen-engine 100 (S500). At time T25, the power of the hydrogen-engine 100 reaches the upper limit. In the second embodiment, the power of the hydrogen-engine 100 is limited to the upper limit or less from the time T25 to the time T26. In contrast, in the comparative example, the power of the hydrogen-engine 100 is not limited from the time T25 to the time T26.

In the second embodiment, since the power of the hydrogen-engine 100 is limited from the time T25 to the time T26, an increase in the oil temperature is suppressed as compared with the comparative example. The peak value of the crankcase pressure decreases due to the suppression of the increase in the oil temperature.

In the time T26, a predetermined time period elapses. For this reason, the control device 50 terminates the limit of the power of the hydrogen-engine 100 at the time T26 (S502: YES, S504).

Effect of the Second Embodiment (2-1) The control device 50 sets an upper limit value to the output of the hydrogen engine 100 to limit the output of the hydrogen engine 100 to an upper limit value or less (from S500 to S504) from when the oil temperature exceeds the threshold temperature to a predetermined time.

According to the above configuration, the control device 50 limits the output of the hydrogen engine 100 to the upper limit value or less in a predetermined period from when the oil temperature exceeds the threshold temperature. Therefore, it is possible to prevent the output of the hydrogen engine 100 from becoming excessively large during the predetermined period.

Example of Change

The elements that can be changed in the first embodiment and the second embodiment are as follows. The following modifications may be implemented in combination with each other to the extent that they are not technically inconsistent.

- In the first embodiment, at least one of S302 and S304 may be omitted.
- S302 of the second embodiment may be omitted.
- The first embodiment and the second embodiment may be combined with each other within a range not technically contradicting each other. For example, for the first embodiment, the aspect of limiting the output of the hydrogen engine 100 may be changed to the aspect of limiting the output of the hydrogen engine 100 of the second embodiment.
- In the first embodiment and the second embodiment, the output of the hydrogen engine 100 is not limited during the one trip after the flow is completed once during the one trip. However, for example, if the crankcase pressure is greater than the threshold pressure immediately after the output of the hydrogen engine 100 has been limited, the output of the hydrogen engine 100 may be limited again.

What is claimed is:

1. A control device for a hydrogen engine including a blow-by gas passage through which blow-by gas leaked from a combustion chamber into a crankcase is recirculated from the crankcase to an intake passage, wherein a threshold temperature is preset based on a temperature at which moisture contained in oil stored in the crankcase starts to evaporate in the crankcase, and the control device is configured to limit power of the hydrogen engine for a predetermined period from a time when an oil temperature of the oil exceeds the threshold temperature.

2. The control device according to claim 1, wherein:

the hydrogen engine further includes a pressure sensor configured to detect a crankcase pressure in the crankcase;

the control device is configured to limit the power of the hydrogen engine for the predetermined period when a logical product condition is satisfied, the logical product condition including a condition that the oil temperature exceeds the threshold temperature and a condition that the crankcase pressure detected by the pressure sensor exceeds a threshold pressure; and the threshold pressure is set to a value lower than a pressure at which the oil is jetted from the blow-by gas passage toward the intake passage.

3. The control device according to claim 1, wherein:

the hydrogen engine further includes a pressure sensor configured to detect a crankcase pressure in the crankcase;

the control device is configured to limit the power of the hydrogen engine for the predetermined period when the crankcase pressure exceeds a threshold pressure within a given period after the oil temperature has exceeded the threshold temperature; and the threshold pressure is set to a value lower than a pressure at which the oil is jetted from the blow-by gas passage toward the intake passage.

4. The control device according to claim 1, wherein:

the hydrogen engine further includes a pressure sensor configured to detect a crankcase pressure in the crankcase;

the control device is configured to limit the power of the hydrogen engine for the predetermined period when a logical product condition is satisfied for a first time during one trip that is a period from a start of the hydrogen engine to a stop of the hydrogen engine, the logical product condition including a condition that the oil temperature exceeds the threshold temperature and a condition that the crankcase pressure detected by the pressure sensor exceeds a threshold pressure; and the threshold pressure is set to a value lower than a pressure at which the oil is jetted from the blow-by gas passage toward the intake passage.

5. The control device according to claim 1, wherein the control device is configured to set an upper limit value for the power of the hydrogen engine and limit the power of the hydrogen engine to the upper limit value or less for the predetermined period from the time when the oil temperature exceeds the threshold temperature.

* * * * *